United States Patent
Krümpel et al.

(10) Patent No.: US 6,841,621 B2
(45) Date of Patent: Jan. 11, 2005

(54) POLYETHYLENE MOLDING COMPOUND SUITABLE AS A PIPE MATERIAL WITH EXCELLENT PROCESSING PROPERTIES

(75) Inventors: Peter Krümpel, Bad Camberg (DE); Johannes-Friedrich Enderle, Frankfurt (DE)

(73) Assignee: Basell Polyolefine GmbH (DE)

( * ) Notice: Subject to any disclaimer, the term of this patent is extended or adjusted under 35 U.S.C. 154(b) by 126 days.

(21) Appl. No.: 10/381,246

(22) PCT Filed: Sep. 8, 2001

(86) PCT No.: PCT/EP01/10381
§ 371 (c)(1),
(2), (4) Date: Mar. 21, 2003

(87) PCT Pub. No.: WO02/26880
PCT Pub. Date: Apr. 4, 2002

(65) Prior Publication Data
US 2004/0005424 A1 Jan. 8, 2004

(30) Foreign Application Priority Data
Sep. 27, 2000 (DE) .......................... 100 47 861

(51) Int. Cl.[7] .................. C08L 23/00; C08L 23/04; F16L 9/22; E21B 17/10
(52) U.S. Cl. .................. 525/191; 525/240; 138/177; 138/DIG. 7; 166/242.1
(58) Field of Search ................. 525/191, 240; 138/177, DIG. 7; 166/242.1

(56) References Cited

U.S. PATENT DOCUMENTS

| | | | |
|---|---|---|---|
| 4,311,752 A | 1/1982 | Diedrich et al. | 428/220 |
| 5,338,589 A | 8/1994 | Böhm et al. | 428/36.9 |
| 5,539,076 A | 7/1996 | Nowlin et al. | 526/348.1 |
| 5,582,923 A | 12/1996 | Kale et al. | 428/523 |
| 6,346,575 B1 * | 2/2002 | Debras et al. | 525/191 |
| 6,433,095 B1 * | 8/2002 | Laurent | 525/240 |
| 6,441,096 B1 * | 8/2002 | Backman et al. | 525/240 |
| 6,723,795 B1 * | 4/2004 | Dupire et al. | 525/240 |

FOREIGN PATENT DOCUMENTS

| | | |
|---|---|---|
| EP | 0 003 129 | 7/1984 |
| EP | 0 436 520 | 7/1991 |
| EP | 0 603 935 | 6/1994 |
| EP | 0 707 040 | 4/1996 |
| EP | 0 757 076 | 2/1997 |
| WO | 91/18934 | 12/1991 |
| WO | 95/11264 | 4/1995 |

OTHER PUBLICATIONS

Wild et al., "Crystallizability Distributions In Polymers: A New Analytical Technique", *Polym. Prep. A, Chem. Soc.–Polym. Chem. Div* 18, pp. 182–187 (1977).
Fleißner in *Kunststoffe* 77, pp. 45–50 (1987).

* cited by examiner

*Primary Examiner*—Nathan M. Nutter
(74) *Attorney, Agent, or Firm*—Connolly Bove Lodge & Hutz LLP

(57) ABSTRACT

The invention relates to a polymeric molding compound made from a first ethylene polymer (A) and from a second ethylene polymer (B) which is particularly suitable for producing thick-walled large-caliber pipes, wherein the molding compound comprises an amount in the range from 55 to 75% by weight of the first ethylene polymer (A) and an amount in the range from 25 to 45% by weight of the second ethylene polymer (B), based in each case on the total weight of the molding compound, where the first ethylene polymer (A) is a copolymer of ethylene with a 1-olefin having a total number of carbon atoms in the range from 4 to 10 as comonomer, and with a proportion of from 0.2 to 5% by weight of comonomer, based on the weight of the first ethylene polymer (A), and with a wide bimodal molar mass distribution, and where the second ethylene polymer (B) is a copolymer made from ethylene units and from a 1-olefin having a number of carbon atoms in the range from 4 to 10, which has a bimodal molar mass distribution differing from that of the first ethylene polymer (A). The invention further relates to a high-strength pipe made from this molding compound, and to its use for the transport of gas or water.

17 Claims, 1 Drawing Sheet

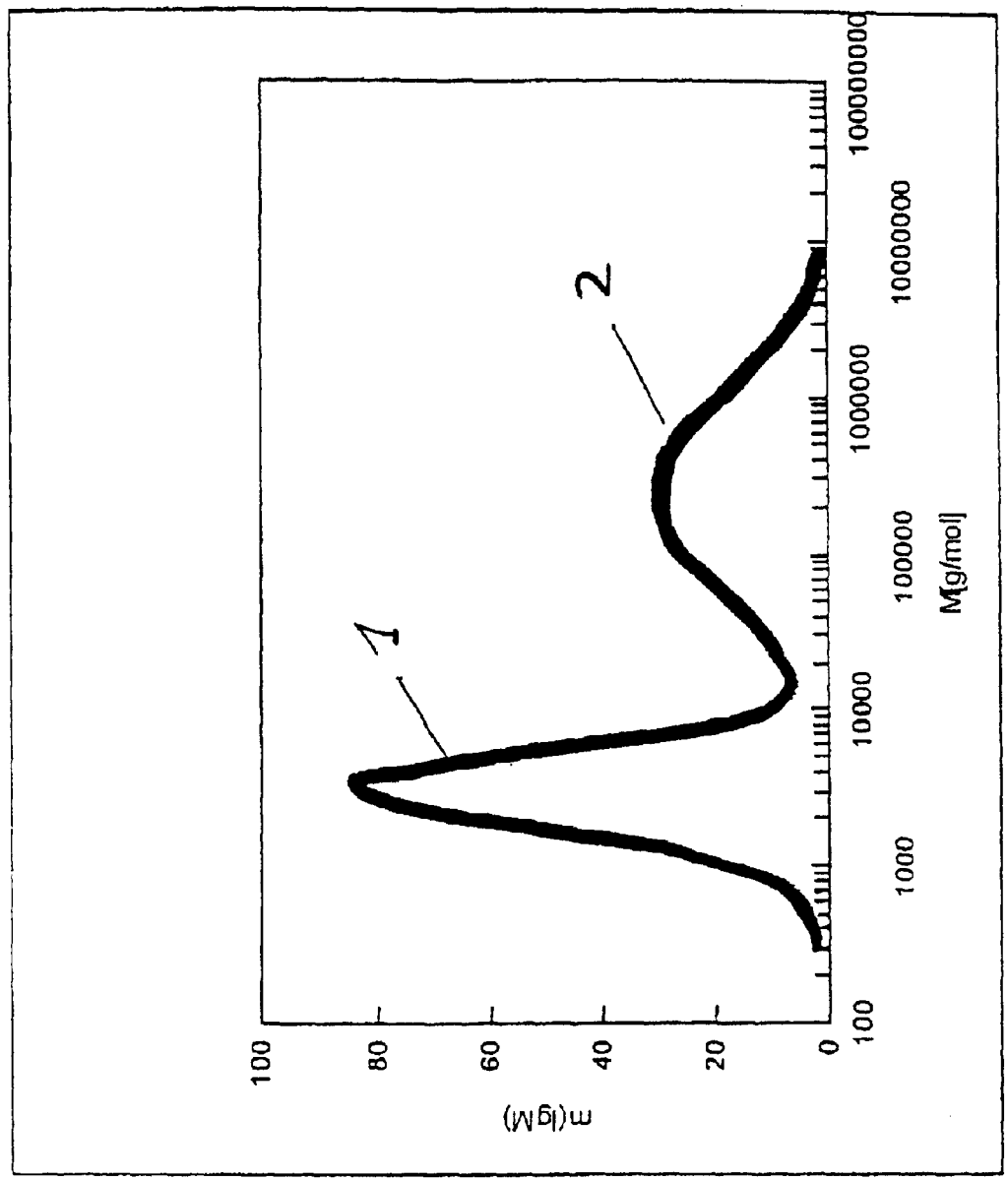

POLYETHYLENE MOLDING COMPOUND SUITABLE AS A PIPE MATERIAL WITH EXCELLENT PROCESSING PROPERTIES

The present invention relates to a polymeric molding compound made from a first ethylene polymer (A) and from a second ethylene polymer (B). The processing properties of the molding compound make it particularly suitable for producing thick-walled, large-caliber pipes.

Polyethylene is widely used for producing pipes, e.g. for gas transport or water transport systems, because pipes of this type require a material with high mechanical strength, high corrosion resistance, and good long-term resistance. Numerous publications describe materials with a very wide variety of properties, and processes for their preparation.

EP-A-603,935 has previously described a molded compound based on polyethylene and having a bimodal molar mass distribution, and intended, inter alia, to be suitable for producing pipes. However, pipes produced from the molding compounds of that reference are highly unsatisfactory in relation to their long-term resistance to internal pressure, their stress-cracking resistance, their low-temperature notch impact strength, and their resistance to rapid crack propagation.

In order to obtain pipes with balanced mechanical properties and therefore with an ideal combination of properties, it is necessary to use a polymer with still broader molar mass distribution. A polymer of this type has been described in U.S. Pat. No. 5,338,589, and is prepared using a high-activity Ziegler catalyst which is known from WO 91/18934, the magnesium alkoxide used there being a gel-type suspension.

A disadvantage with the processing of the known molding compounds is that their melt strength is too low. This becomes noticeable particularly during processing to give pipes. A specific risk apparent during that process is that the pipe breaks open while molten or during consolidation of the pipe, e.g. in a vacuum calibrator unit. In addition, the low melt strength frequently leads to continuous instability of the extrusion process. Furthermore, when the known molding compounds are processed a problem of sagging arises during extrusion of thick-walled pipes. The problem is that specified thickness tolerances cannot be complied with during industrial manufacture since the total time required for consolidation of the pipes from thermo-plastic is up to a number of hours and the dead weight of the melt therefore causes uneven wall thickness measured around the entire circumference of the pipes.

It was therefore an object of the invention to provide a polyethylene molding compound which has sufficiently high melt strength to permit its use for producing large-caliber, thick-walled pipes with no risk of break-open of the pipes during production or of the problem of sagging, but at the same time with mechanical properties and product homogeneity which are sufficient to comply with the quality criteria for the pipes, such as long-term resistance to internal pressure, high stress-cracking resistance, low-temperature notch impact strength, and high resistance to rapid crack propagation.

This object is achieved by way of a molding compound of the type stated at the outset, the characterizing features of which are that the molding compound comprises an amount in the range from 55 to 75% by weight of the first ethylene polymer (A) and an amount in the range from 25 to 45% by weight of the second ethylene polymer (B), based in each case on the total weight of the molding compound, where the first ethylene polymer (A) is a copolymer of ethylene with a 1-olefin having a total number of carbon atoms in the range from 4 to 10 as comonomer, and with a proportion of from 0.2 to 5% by weight of comonomer, based on the weight of the first ethylene polymer (A), with a wide bimodal molar mass distribution, and where the second ethylene polymer (B) is a copolymer made from ethylene and from a 1-olefin having a number of carbon atoms in the range from 4 to 10, which has a bimodal molar mass distribution differing from that of the first ethylene polymer (A).

The molding compound of the invention is prepared by mixing the components of the mixture, prepared separately from one another, the first ethylene polymer (A) and the second ethylene polymer (B), in an extruder in the form of an extruder blend.

The molding compound of the invention, which can be used to manufacture a pipe in compliance with the demanding quality criteria on which the object of the invention is based, preferably comprises a first ethylene polymer (A) with a density (measured at a temperature of 23° C.) in the range from 0.94 to 0.96 g/cm$^3$ and comprises a broad bimodal molar mass distribution, where the ratio, within the ethylene polymer (A), between the weight of the low-molecular-weight fraction and the weight of the higher-molecular-weight fraction is in the range from 0.5 to 2.0, preferably from 0.8 to 1.8. According to the invention, the first ethylene polymer (A) contains small proportions of other comonomer units, such as 1-butene, 1-pentene, 1-hexene, or 4-methyl-1-pentene.

The bimodality of the first ethylene polymer (A) may be described as a measure of the position of the centers of gravity of two individual molar mass distributions, with the aid of the viscosity numbers VN to ISO/R 1191 of the polymers formed in two separate polymerization stages. $VN_1$ of the low-molecular-weight polyethylene formed in the first polymerization stage here is from 40 to 80 cm$^3$/g, whereas $VN_{total}$ of the final product is in the range from 350 to 450 cm$^3$/g. $VN_2$ of the higher-molecular-weight polyethylene formed in the second polymerization stage can be calculated from the following mathematical formula:

$$VN_2 = \frac{VN_{total} - w_1 \cdot VN_1}{1 - w_1}$$

where $w_1$ is the proportion by weight of the low-molecular-weight polyethylene formed in the first stage, measured in % by weight, based on the total weight of the polyethylene formed in both stages and having bimodal molar mass distribution. The value calculated for $VN_2$ is normally in the range from 500 to 880 cm$^3$/g.

The first ethylene polymer (A) is obtained by polymerizing the monomers in suspension, in solution, or in the gas phase, at temperatures in the range from 20 to 120° C., at a pressure in the range from 2 to 60 bar, and in the presence of a Ziegler catalyst composed of a transition metal compound and of an organoaluminum compound. The polymerization is carried out in two stages, hydrogen being used in each stage to regulate the molar mass of the polymer produced.

According to the invention, therefore, a first ethylene polymer (A) is prepared and contains an amount in the range from 35 to 65% by weight of low-molecular-weight homopolymer as component ($A^1$), and contains an amount in the range from 65 to 35% by weight of high-molecular-weight copolymer as component ($A^2$), based on the total weight of the first ethylene polymer (A).

The low-molecular-weight homopolymer of component ($A^1$) here has a viscosity number $VN^{A1}$ in the range from 40 to 90 cm$^3$/g, and has an MFR$^{A1}_{190/2.16}$ in the range from 40 to 2000 dg/min. According to the invention, the density d$^{A1}$ of the low-molecular-weight homopolymer of component (A$^1$) is in the range up to a maximum of 0.965 g/cm$^3$.

In contrast, the high-molecular-weight copolymer of component (A$^2$) has a viscosity number VN$^{A2}$ in the range from 500 to 1000 cm$^3$/g and a density d$^{A2}$ in the range from 0.922 to 0.944 g/cm$^3$.

A very useful tool for determining comonomer distribution in semicrystalline polyethylene is preparative TREF (Temperature-Rising Elution Fractionation). This is described in Polym. Prep. A, Chem. Soc.—Polym. Chem. Div., 18, 182 (1977) by L. Wild and T. Ryle under the title: "Crystallization distribution in Polymers: A new analytical technique". This fractionating method is based on the different ability of the individual components of a polymer to crystallize in polyethylene, and therefore permits the semicrystalline polymer to be separated into various fractions which are simply a function of the thickness of the crystallite lamellae.

FIG. 1 shows the result of a gel-permeation chromatography study of a TREF fraction at 78° C. of a copolymer typically used as first ethylene polymer (A) for the molding compound of the invention.

The peak indicated by reference numeral 1 covers the low-molecular-weight, but highly crystalline, PE fraction, soluble at 78° C., while the peak with reference numeral 2 represents the high-molecular-weight fraction with high comonomer content, this fraction being responsible for the large number of "tie molecules" between the crystallite lamellae and for the quality of the molding compound of the invention, expressed in terms of its extremely high stress-cracking resistance. The high-molecular-weight copolymer of component (A$^2$) in the fraction at a temperature of 78° C. from preparative TREF therefore has an average molar mass, expressed in terms of the weight average M$_w$, of $\geq$180000 g/mol.

The second ethylene polymer (B) present in the molding compound of the invention is a copolymer of ethylene which likewise has a bimodal molar mass distribution and has an MFR$^B_{190/5}$ in the range from 0.09 to 0.19 dg/min, a density d$^B$ in the range from 0.94 to 0.95 g/cm$^3$, and a viscosity number VN$^B$ in the range from 460 to 520 cm$^3$/g.

According to the invention, therefore, a second ethylene polymer (B) is prepared in the form of a reactor blend in the presence of a Ziegler catalyst, and comprises an amount in the range from 15 to 40% by weight of ultrahigh-molecular-weight ethylene homo-polymer as component (B$^1$) and comprises an amount in the range from 60 to 85% by weight of low-molecular-weight copolymer with 1-butene, 1-hexene, or 1-octene as comonomer in an amount of from 1 to 15% by weight, as component (B$^2$), based on the total weight of the second ethylene polymer (B). The ultrahigh-molecular-weight ethylene homopolymer of component (B$^1$) here has a viscosity number, VN$^{B1}$, in the range from 1000 to 2000 cm$^3$/g, and the low-molecular-weight copolymer of component (B$^2$) has a viscosity number, VN$^{B2}$, in the range from 80 to 150 cm$^3$/g.

The molding compound of the invention for the pipe to be produced may also comprise other additives besides the first ethylene polymer (A) and the second ethylene polymer (B). Examples of these additives are heat stabilizers, antioxidants, UV absorbers, light stabilizers, metal deactivators, compounds which decompose peroxides, or basic costabilizers, in amounts of from 0 to 10% by weight, preferably from 0 to 5% by weight, and also fillers, reinforcing agents, plasticizers, lubricants, emulsifiers, pigments, optical brighteners, flame retardants, antistats, blowing agents, or combinations of these, in total amounts of from 0 to 50% by weight, based on the total weight of the molding compound.

The manner of producing the pipe from the molding compound of the invention is that the molding compound is first plastified in an extruder at temperatures in the range from 200 to 250° C. and is then extruded through an annular die and cooled. Pipes made from the molding compound of the invention are generally suit-able for all pressure classes to DIN 8074.

For processing to give pipes, use may be made either of conventional single-screw extruders with smooth feed zone or of high-performance extruders which have a finely grooved barrel and have a feed with conveying action. The screws are typically designed as decompression screws with lengths from 25 to 30 D (D=Ø). The decompression screws have a metering zone in which temperature differences within the melt are evened out, and in which the intention is to dissipate the relaxation stresses produced by shear.

The melt coming from the extruder is first distributed by way of conically arranged holes around an annular cross section, and then fed by way of a spiral mandrel distributor or screen pack to the mandrel/die ring combination. When required, there may also be restrictor rings or other design elements installed to render the melt stream uniform prior to die discharge.

Vacuum calibration is advantageously used for calibration and cooling to give large pipe diameters. The actual shaping process takes place using slotted calibrator sleeves, manufactured from non-ferrous metal to improve heat dissipation. A film of water introduced within the inlet serves here for rapid cooling of the surface of the pipe to below the crystallite melting point, and also serves as a lubricating film for reducing frictional forces. The total length L of the cooling section is judged on the basis of the assumption that the intention is that a melt whose temperature is 220° C. is to be cooled with the aid of water whose temperature is from 15 to 20° C. sufficiently for the temperature of the inner surface of the pipe to be not more than 85° C.

Stress-cracking resistance is a feature known previously from EP-A 436 520. The process of slow crack propagation can be substantially influenced via molecular structural parameters, such as molar mass distribution and comonomer distribution. The number of what are called tie molecules or link molecules is first determined by the chain length of the polymer. The morphology of semicrystalline polymers is also adjusted by incorporating comonomers, since the thickness of crystallite lamellae can be influenced by introducing short-chain branching. This means that the number of what are known as tie molecules or link molecules in copolymers is higher than in homopolymers having comparable chain lengths.

Stress-cracking resistance FNCT of the molding compound of the invention is determined by an internal test method. This laboratory method has been described by M. Fleißner in Kunststoffe 77 (1987), pp. 45 et seq. This publication shows that there is a relationship between the determination of slow crack propagation in the long-term test on test specimens with a peripheral notch and the brittle variant of the long-term hydrostatic strength test to ISO 1167. The notch (1.6 mm, razor blade) shortens crackinitiation time and thus time-to-failure in 2% strength aqueous Arkopal N 100 detergent solution acting as stress-crack-promoting medium at a temperature of 95° C. and with tensile stress of 4.0 MPa. The specimens are produced by sawing three test specimens of dimensions 10×10×90 mm from a pressed plaque of thickness 10 mm. A razor blade in a notching apparatus (see FIG. 5 in the Fleißner publication) specifically made for the purpose is used to give the center of the test specimens a peripheral notch of depth 1.6 mm.

Fracture toughness aFM of the molding compound of the invention is likewise determined by an internal test method on test specimens of dimensions 10×10×80 mm, sawn out from a pressed plaque of thickness 10 mm. The razor blade of the abovementioned notching apparatus is used to give six of these test specimens a central notch of depth 1.6 mm. The method of carrying out the tests substantially corresponds to the ISO 179 Charpy test procedure with modified test specimens and modified impact geometry (distance between supports). All of the test specimens are conditioned to the test temperature of 0° C. for from 2 to 3 h. A test specimen is then moved without delay onto the support of a pendulum impact tester to ISO 179. The distance between the supports is 60 mm. The 2 J hammer is released and falls, with the angle of fall adjusted to 160° C., the pendulum length to 225 mm, and the impact velocity to 2.93 m/sec. To evaluate the test, the quotient in mJ/mm$^2$ is calculated from the impact energy consumed and the initial cross-sectional area at the notch $a_{FM}$. The only values here which can be used as the basis for an overall average are those for complete fracture and hinge fracture (see ISO 179).

Shear viscosity is a very particularly important feature of the polymer melt and represents the flow properties of the polymer extruded in molten form to give a pipe, these properties being very decisive according to the invention. It is measured to ISO 6721-10, part 10, in oscillating shear flow in a cone-plate rheometer (RDS test) initially at angular frequency of 0.001 rad/s and melt temperature 190° C., and then at angular frequency 100 rad/s at the same temperature. The two values measured are then placed in relationship to one another, giving the viscosity ratio $\eta(0.001)/\eta(100)$, which according to the invention is to be greater than or equal to 100.

The examples below are intended for further clarification of the description of the invention and its advantages for the skilled worker, in comparison with the prior art.

EXAMPLES 1 TO 9

A first bimodal ethylene polymer (A) was prepared to the specification of WO 91/18934 using a Ziegler catalyst from example 2, which had catalyst component a with operating number 2.2, maintaining the operating conditions stated below in table 1.

TABLE 1

|  | Reactor I Capacity: 120 l | Reactor II Capacity: 120 l |
|---|---|---|
| Temperature | 83° C. | 83° C. |
| Catalyst feed | 0.8 mmol/h | — |
| Cocatalyst feed | 15 mmol/h | 30 mmol/h |
| Dispersing agent (diesel oil; 130–170° C.) | 25 l/h | 50 l/h |
| Ethylene | 9 kg/h | 10 kg/h |
| Hydrogen in gas space | 74% by volume | 1% by volume |
| 1-Butene | 0 | 250 ml/h |
| Total pressure | 8.5 bar | 2.7 bar |

The resultant ethylene polymer (A) had a melt flow index $\mathrm{MFI}^A_{5/190°\ C.}$ of 0.49 dg/min and a density $d^A$ of 0.948 g/cm$^3$, and had a comonomer proportion of 1.5% by weight, based on the total weight of the higher-molecular-weight component.

A second bimodal ethylene polymer (B) was then prepared to the specification of EP-B-0 003 129. For this, 6.7 kg of ethylene/h and 0.24 kg of 1-butene/h were introduced into diesel oil with boiling point in the range from 130 to 170° C. in a stirred tank over a period of 6 h at a constant temperature of 85° C., in the presence of the Ziegler catalyst described in example 1 of the EP-B. After a reaction time of 3 h and 20 min, hydrogen was also introduced under pressure and its addition was continued so as to maintain a constant hydrogen concentration in the region of 60–65% by volume within the gas space of the stirred tank during the remaining reaction time of 2 h and 40 min.

The resultant ethylene polymer (B) had a melt flow index $\mathrm{MFI}^B_{5/190°\ C.}$ of 0.16 dg/min and a density $d^B$ of 0.940 g/cm$^3$.

The first bimodal ethylene polymer (A) was then mixed with the second bimodal ethylene polymer (B) in an extruder.

The mixing ratios are given in the table given below for examples 1 to 9, as are the attendant physical properties of the molding compound resulting from the mixture:

TABLE 2

| Example No: | 1 | 2 | 3 | 4 | 5 | 6 | 7 | 8 | 9 |
|---|---|---|---|---|---|---|---|---|---|
| % by weight of polymer (B) | 0 | 15 | 20 | 25 | 30 | 35 | 40 | 45 | 100 |
| % by weight of polymer (A) | 100 | 85 | 80 | 75 | 70 | 65 | 60 | 55 | 0 |
| MFI 190/5 [dg/min] | 0.49 | 0.31 | 0.3 | 0.295 | 0.285 | 0.27 | 0.26 | 0.24 | 0.16 |
| MFI 190/21.6 [dg/min] | 7.845 | 6.635 | 7.72 | 6.28 | 6.21 | 5.895 | 6.04 | 6.03 | 4.88 |
| FRR* | 16.0 | 21.4 | 25.7 | 21.3 | 21.8 | 21.8 | 23.2 | 25.1 | 37.5 |
| VN [cm$^3$/g] | 344 | 359 | 357 | 356 | 377 | 395 | 390 | 393 | 486 |

*FRR = Ratio of MFI$_{190/21.6}$ to MFI$_{190/5}$

The shear viscosities η of the mixtures of examples 1 to 9 were determined by the test method described above (ISO 6721, part 10), with angular frequency of 0.001 rad/s and angular frequency of 100 rad/s, and the ratio $\eta_{0.001\ r/s}/\eta_{100\ r/s}$ was then calculated. The results are given in table 3 below:

TABLE 3

| Example | η (0.001 rad/s) [Pa · s] | η (100 rad/s) [Pa · s] | η (0.001 rad/s)/ η (100 rad/s) |
|---|---|---|---|
| 1 | $2.25 \cdot 10^5$ | 2 450 | 91.8 |
| 2 | $2.28 \cdot 10^5$ | 2 500 | 91.2 |
| 3 | $2.32 \cdot 10^5$ | 2 556 | 90.7 |
| 4 | $2.78 \cdot 10^5$ | 2 530 | 109.8 |
| 5 | $2.76 \cdot 10^5$ | 2 570 | 107.4 |
| 6 | $3.55 \cdot 10^5$ | 2 540 | 139.8 |
| 7 | $4.02 \cdot 10^5$ | 2 550 | 157.6 |
| 8 | $4.86 \cdot 10^5$ | 2 550 | 190.6 |
| 9 | $11.6 \cdot 10^5$ | 2 720 | 426.5 |

A glance at table 3 shows that the mixtures of examples 1 to 3 are comparative examples in which the ratio of the shear viscosities $\eta_{0.001\ r/s}/\eta_{100\ r/s}$ determined at different angular frequencies is below 100. In contrast, examples 4 to 8 have results according to the invention, and for these examples the ratio by weight of polymer (A) to polymer (B) is also in the range according to the invention, from 55 to 75% by weight of polymer (A) and from 25 to 45% by weight of polymer B.

EXAMPLES 10 TO 12

To determine the homogeneity of the mixture (freedom from specks), the following three further molding compounds were prepared:

Example 10 was the molding compound from example 1, i.e. pure polymer (A).

Example 11 was an in-situ reactor blend, i.e. a modified polymer (A), in which the amounts of ethylene in reactor 1 and reactor 2 were swapped during the production process. 10 kg of ethylene/h were added within reactor 1, and only 9 kg of ethylene/h within reactor 2, plus 260 ml/h of 1-butene as comonomer. The resultant modified polymer (A) had an $MFI^{A'}_{5/190°\ C.}$ of 0.33 dg/min, and a density of 0.956 g/cm$^3$, and contained an amount of 1.7% by weight of comonomer, based on the total weight of the higher-molecular-weight component.

Example 12 was a mixture made from 34% by weight of polymer (B) and 66% of polymer (A).

Polymer powder from examples 10 and 11 was pelletized in an extruder and then processed to give blown films of thickness 5 μm The mixture of example 12 made from the powders of the polymers (A) and (B) was then prepared in the same extruder at the same temperature and the same output rate, and further processed by a similar method. The shear viscosities η of these molding compounds were then measured at the different angular frequencies and their relationship determined, and homogeneity (freedom from specks) was tested. The results from examples 10 to 12 are given in table 4 below:

TABLE 4

| Example | η ($10^{-3}$ rad/s) [Pa · s] | η (100 rad/s) [Pa · s] | $\eta_{0.001\ r/s}/\eta_{100\ r/s}$ | Homogeneity to GKR guideline, max. size[*] |
|---|---|---|---|---|
| 10 | $1.70 \cdot 10^5$ | 2 570 | 66.1 | 0.013 |
| 11 | $2.55 \cdot 10^5$ | 2 400 | 106.3 | 0.014 |
| 12 | $3.75 \cdot 10^5$ | 1 980 | 146 | 0.0010 |

[*]Homogeneity is determined to the guideline of the Gütegemeinschaft Kunststoffrohre [Quality association for plastic pipes] e.V. No. R 14.3.1 DA, 3.1.1.3.

Other properties of the polymers prepared in examples 10 to 12 are given in table 5 below.

TABLE 5

| Example | Density [g/cm$^3$] | $MFR_{190/21.6}$ [dg/min] | Viscosity number [ml/g] |
|---|---|---|---|
| 10 | 0.954 | 9.2 | 330 |
| 11 | 0.956 | 9.52 | 370 |
| 12 | 0.954 | 8.8 | 340 |

It is entirely surprising to the skilled worker that a sudden improvement in homogeneity and freedom from specks is given, at the same temperature and the same throughput rate, only by the mixture of the invention.

The test methods given in the description prior to the examples were then also used to determine FNCT stress-cracking resistance [h] at a temperature of 95° C., and fracture toughness aFM [kJ/m$^2$] at a temperature of 0° C. The results are given in table 6 below:

TABLE 6

| | aFM [kJ/m$^2$] | FNCT [h] |
|---|---|---|
| Example 10 | 8.9 | not determined |
| Example 11 | 8.1 | 130.1 |
| Example 12 | 10.6 | 175.0 |

Here again, it is clear that a step increase in FNCT stress-cracking resistance and, together with this, also a step increase in fracture toughness aFM are given only by the mixture of the invention made from ethylene polymer A and ethylene polymer B in the mixing ratio found according to the invention.

What is claimed is:

1. A polymeric molding compound made from a first ethylene polymer (A) and from a second ethylene polymer (B) which is particularly suitable for producing thick-walled large-caliber pipes, wherein the molding compound comprises an amount in the range from 55 to 75% by weight of the first ethylene polymer (A) and an amount in the range from 25 to 45% by weight of the second ethylene polymer (B), based in each case on the total weight of the molding compound, where the first ethylene polymer (A) is a copolymer of ethylene with a 1-olefin having a total number of carbon atoms in the range from 4 to 10 as comonomer, and with a proportion of from 0.2 to 5% by weight of comonomer, based on the weight of the first ethylene polymer (A), with a wide bimodal molar mass distribution, and where the second ethylene polymer (B) is a copolymer made from ethylene units and from a 1-olefin having a number of carbon atoms in the range from 4 to 10, which has a bimodal molar mass distribution differing from that of the first ethylene polymer (A).

2. The polymeric molding compound as claimed in claim 1, which is prepared by mixing the mixing components, prepared separately from one another, the first ethylene polymer (A) and the second ethylene polymer (B), in an extruder in the form of an extruder blend.

3. The polymeric molding compound as claimed in claim 1, which comprises a first ethylene polymer (A) with a density (measured at a temperature of 23° C.) in the range from 0.94 to 0.96 g/cm$^3$ and comprises a broad bimodal molar mass distribution, where the ratio, within the ethylene polymer (A), between the weight of the low-molecular-weight fraction and the weight of the higher-molecular-weight fraction is in the range from 0.5 to 2.0.

4. The polymeric molding compound as claimed in claim 2, which comprises a first ethylene polymer (A) with a density (measured at a temperature of 23° C.) in the range from 0.94 to 0.96 g/cm$^3$ and comprises a broad bimodal molar mass distribution, where the ratio, within the ethylene polymer (A), between the weight of the low-molecular-weight fraction and the weight of the higher-molecular-weight fraction is in the range from 0.8 to 1.8.

5. The polymeric molding compound as claimed in claim 1, wherein the first ethylene polymer (A) contains an amount from 0.2 to 4.5% by weight of other comonomer units selected from the group consisting of 1-butene, 1-pentene, 1-hexene, 4-methyl-1-pentene, and mixtures of these.

6. The polymeric molding compound as claimed in claim 4, wherein the first ethylene polymer (A) contains an amount from 0.2 to 4.5% by weight of other comonomer units selected from the group consisting of 1-butene, 1-pentene, 1-hexene, 4-methyl-1-pentene, and mixtures of these.

7. The polymeric molding compound as claimed in claim 1, which comprises, based on the total weight of the second ethylene polymer (B), which has been prepared in the form of a reactor blend in the presence of a Ziegler catalyst, and which comprises an amount in the range from 15 to 40% by weight of ultrahigh-molecular-weight ethylene homopolymer as component (B$^1$) and comprises an amount in the range from 60 to 85% by weight of low-molecular-weight copolymer with 1-butene as comonomer in an amount of from 1 to 15% by weight, as component (B$^2$).

8. The polymeric molding compound as claimed in claim 6, which comprises, based on the total weight of the second ethylene polymer (B), which has been prepared in the form of a reactor blend in the presence of a Ziegler catalyst, and which comprises an amount in the range from 15 to 40% by weight of ultrahigh-molecular-weight ethylene homopolymer as component (B$^1$) and comprises an amount in the range from 60 to 85% by weight of low-molecular-weight copolymer with 1-butene as comonomer in an amount of from 1 to 15% by weight, as component (B$^2$).

9. The polymeric molding compound as claimed in claim 7, wherein the ultrahigh-molecular-weight ethylene homopolymer of component (B$^1$) has a viscosity number, VN$^{B1}$, in the range from 1000 to 2000 cm$^3$/g, and wherein the low-molecular-weight homopolymer of component (B$^2$) has a viscosity number, VN$^{B2}$, in the range from 80 to 150 cm$^3$/g.

10. The polymeric molding compound as claimed in claim 1, wherein the molding compound has fracture toughness aFM greater than or equal to 10 kJ/m$^2$.

11. The polymeric molding compound as claimed in claim 1, wherein the molding compound has an FNCT stress-cracking resistance of $\geq$150 h.

12. The polymeric molding compound as claimed in claim 1, wherein the molding compound has shear viscosity, measured at 0.001 rad/s, is $\geq 2.0 \cdot 10^5$ Pa·s.

13. The polymeric molding compound as claimed in claim 8, wherein the molding compound has shear viscosity, measured at 0.001 rad/s, is $\geq 2.7 \cdot 10^5$ Pa·s.

14. The polymeric molding compound as claimed in claim 1, wherein the molding compound the viscosity ratio of the shear viscosities of the molding compound $\eta_{(0.001)}/\eta_{(100)}$ is greater than or equal to 100.

15. A high-strength pipe made from the molding compound as claimed in claim 1, wherein the ethylene polymer A contains comonomers having from 4 to 6 carbon atoms, the amount being from 0 to 0.1% by weight in the low-molecular-weight fraction and from 2.5 to 4% by weight in the higher-molecular-weight fraction, and has a melt flow index MFI$_{5/190° C.}$ of $\leq$0.35 g/10 min.

16. The pipe as claimed in claim 15, wherein the pipe has a resistance to rapid crack propagation, measured to ISO/DIS 13477 on a pipe in pressure class PN 10 with diameter 110 mm (S4 test) is greater than or equal to 20 bar.

17. A method of transporting gases or water which comprises transporting the gases or the water through the pipe as claimed in claim 15.

* * * * *